3,119,711
PRETREATMENT OF GLASS FIBERS WITH EPOXIDIZED COMPOUNDS HAVING AN OXIRANE CONTENT ABOVE ABOUT 8.5 PERCENT
Raymond W. Starmann, Evergreen Park, and Thomas W. Findley, La Grange, Ill., assignors to Swift & Company, Chicago, Ill., a corporation of Illinois
No Drawing. Filed Apr. 1, 1960, Ser. No. 19,144
12 Claims. (Cl. 117—62.2)

This invention relates to the treatment of glass fibers and, more particularly, to the lubrication, sizing and coating of glass fibers during the production and subsequent use thereof.

In the manufacture of glass fibers, glass in filamentous form as a number of fine filaments is drawn from a supply of molten glass continuously and the filaments are gathered together to form strands. During the manufacture and processing of these filaments, it is necessary to apply a lubricant to the surface of the fibers to reduce mutual abrasion and improve handling characteristics of the fibers. Moreover, it is also the practice in glass fiber manufacture to give the fiber a sizing treatment to develop cohesive strength in the fibers and increase the ease of manipulation of the fibers by reducing the tendency of the fibers to "gather" when strands are formed. Sizing also minimizes the amount of "lint" and "fly" in subsequent operations. After the fibers are formed into a fabric, the size and/or lubricant are burned off to clean the fibers. Gelatin, ethylene oxide polymers and other sizes are ordinarily burned off by passing the fabric into an oven held at a temperature in the range of about 900–1300° F. While this cleaning treatment is adequate to remove lubricants and sizing materials, it does effect a weakening in the mechanical strength of the glass fibers.

If a coating composition is to be applied to the fabric, the coating is deposited on the fabric after the cleaning operation. Coating compositions in the form of thermoplastic resins are particularly useful for this purpose, since under the influence of heat and pressure they can be caused to impregnate the interstices of the fabric or laminate. It is customary to employ different materials for lubrication and sizing and for the coating operation inasmuch as the characteristics required in a good lubricant are not usually found in a desirable sizing agent. Further, good lubricants are not generally satisfactory as coating compositions.

It is, therefore, an object of this invention to provide a method for treating glass fibers with a polymerizable lubricant which can be employed to lubricate and/or size the fibers.

Another object of the invention is the provision of a method for lubricating glass fibers during the manufacture thereof and forming a coating on said fibers, which coating can be cured to form a hard, tough protective layer.

Still another object is to provide coated glass fibers, the coating having a high resistance to flow at elevated temperatures and serving the dual purpose of a lubricant during manufacture and a hard protective layer after a fabric of the fibers is woven and formed.

A further object is to provide coated glass fibers, the coating being very compatible with impregnating resins customarily employed in coating fibers.

Additional objects if not specifically set forth herein will be readily apparent to those skilled in the art from the detailed description of the invention which follows.

Generally, the invention comprises applying to the surface of glass fibers a polymerizable lubricant comprising an epoxidized higher fatty acid ester or a prepolymer of an epoxidized higher fatty acid derivative to lubricate the fibers, followed by the partial polymerization of the lubricant to size the fibers or substantially complete polymerization to form a protective coating on the fibers. If the treating agent is employed as a lubricant, it may be deposited on the fibers at any stage of manufacture where ease of manipulation is desired, although it is generally applied immediately after the fibers leave the orifice. The filament, having a thin film of the treating agent thereon, may then be exposed to curing conditions to partically polymerize the lubricant and thereby increase the cohesiveness of the filaments. The coated filaments thus develop a tackiness or adhesive strength, but do not lose lubricity. The sized fibers are then formed into a strand, which strand in turn shows good resistance to "gathering" as individual fibers break. The strands are then woven into fabrics, which fabrics may be laminated. If the treating agent has previously been partially polymerized on the filament to develop a size, more of the polymerizable treating agent may be deposited on the sized fiber after the fabric is formed and the additional polymerizable material cured in the fabric or in the laminate formed from the fabric.

The polymerizable treating agent may be a water-dispersible lower aliphatic alcohol ester of an oxirane-containing higher fatty acid or a water-soluble or water-dispersible prepolymer of lower aliphatic alcohol esters of said oxirane-containing fatty acids. While the water-dispersible ester may be employed per se in treating fibers, or in aqueous emulsion, the prepolymer is generally applied from aqueous solution.

Partial polymerization of the polyepoxide prior to application of the prepolymer to the fiber can be effected in one of several ways: partial polymerization of a highly epoxidized fatty acid ester with a polyamine is disclosed in application Serial No. 19,147, filed of even date herewith for Prepolymers From Epoxidized Oils; polyether polymers may be prepared by partial reaction of a polyepoxidized fatty composition with strong Lewis acid catalysts as disclosed in copending application Serial No. 651,822, filed April 10, 1957, and now U.S. Patent No. 3,035,069. Reaction of these polyepoxides of lower aliphatic alcohol esters of oxirane-containing higher fatty acids with di- or polybasic acids to form polyester polymers is disclosed in copending application Serial No. 651,821, filed April 10, 1957, and now U.S. Patent No. 3,006,936. This reaction can be stopped at the prepolymer stage when there are still unreacted carboxyl and epoxide groups by neutralizing at least one carboxyl group with a volatile base and making a water solution. This prepolymer can then be cross-linked by baking to volatalize the base and complete the reaction between acid and epoxide groups. Polyesters are formed by heating an epoxidized fatty material such as epoxidized soybean oil or epoxidized linseed oil with a stoichiometric amount of an organic dicarboxylic acid or anhydride or an inorganic di- or tribasic acid until an exothermic reaction is initiated. The linear polyesters which are produced are soluble in organic solvents such as ethers, halogenated hydrocarbons, etc. The disclosures in each of the foregoing applications are incorporated herein by reference.

Oxirane-containing fatty materials which may provide the source of epoxy groups include polyepoxy animal, vegetable and marine triglycerides such as epoxidized soybean oil, epoxidized safflower seed oil, epoxidized linseed oil, epoxidized menhaden oil, epoxidized sardine oil, and other epoxidized naturally occurring and synthetic triglycerides, which must be epoxidized in an amount sufficient to provide two or more epoxy groups per molecule.

Preferred epoxy esters providing the benefits of the invention include fluid high viscosity aliphatic alcohol esters of epoxy fatty acids having 10–22 carbons and an oxirane content in excess of 8.5%. Monohydric and dihydric alcohol esters of high oxirane fatty acids which are contemplated include lower (1–8 carbons) monohydric alcohol esters of the high epoxy fatty acids and lower (2–6 carbons) dihydric alcohol esters of high oxirane fatty acids as well as tri-, tetra-, penta-, and hexahydric alcohol esters of the epoxy-containing fatty acid moiety. The fatty acid portion of the high oxirane ester is made up of those fatty acids and mixtures of fatty acids having 10–30 carbons and an oxirane content of above about 8.8%. Such fatty acids are obtained from naturally occurring oils which, when substantially completely epoxidized, contain the requisite amount of oxirane oxygen. Vegetable and marine triglycerides are particularly suitable and the drying and semi-drying vegetable oils, when epoxidized, are preferred. Among those oils which may be used are highly epoxidized perilla oil and highly epoxidized linseed oil. The higher the oxirane content of a given ester, the more cross-linking will occur upon curing and therefore a better protective coating will be produced. If the oxirane-containing ester is derived from a naturally occuring glyceride, the triglyceride should have a degree of unsaturation represented by an iodine value of about 170 to about 205 prior to epoxidation, and the fatty acids contained therein should be neither hydroxylated nor possess conjugated unsaturation. When these materials are epoxidized, they will possess a low iodine value, less than about 10, a high percentage of oxirane oxygen, above about 8.3% and generally in the range 8.8–9.5%. These esters and mixtures of esters which are highly suitable for use in accordance with the present invention are disclosed in copending application Serial No. 807,985, filed on April 22, 1959, by Frank E. Kuester et al.

The esters, because of their low viscosity, may be applied to the glass filaments by spraying or roller coating (passing fibers over felt rollers saturated with the ester), or passing the fibers through a body of the high oxirane ester. Any difficulty in obtaining a continuous monomolecular film of the treating agent on the fiber can be minimized by incorporating in the ester a spreading agent, such as monoglycerides or other fat emulsifiers. Also, the fatty epoxide can be formulated as an emulsion containing 50% oxirane-containing ester in water and the emulsion can be diluted further with additional water to provide an emulsion having an approximate concentration of 1.5% of the ester.

Prepolymers of the oxirane-containing esters noted above with polyamines comprise water-soluble condensation products prepared by heating and reacting the epoxy ester with the polyamine until the reaction product is soluble in a 1% acetic acid solution. Suitable prepolymers include those prepared from epoxidized linseed oil having an oxirane content of about 9.0% and tetraethylene pentamine. About 30–40 parts of the polyamine are reacted with about 100 parts of the high oxirane oil, and the mixture is agitated and heated over a period of time until an aliquot of the reaction mixture when admixed with a 1% aqueous acetic acid solution is miscible. At this point the polyamine has reacted with the epoxy group and/or the ester group in the high oxirane oil, but the reaction has not been permitted to proceed to a sufficient extent to obtain cross-linking. Thus, the prepolymer is soluble in a very weak acetic solution, yet can be cured by the application of heat after removal of the water to form a tough, hard coating. Inasmuch as the prepolymer is cationic in nature, this material exhibits a high degree of attraction for the glass fibers and distribution of the prepolymer on the glass fibers is superior.

Other polyamines which can be reacted with the high oxirane fatty acid ester to form the prepolymers include in general those linear polyamines, such as the alkylene polyamines of 2 to 10 carbons and/or the piperazines.

The polyamine reactant may be selected from any of the various polyamines having at least two nitrogen atoms, and at least one carbon between nitrogens. These compositions include linear polyamines such as alkylene polyamines of 2–10 carbons; arylamines such as benzenoid polyamines; saturated heterocyclic diamino hydrocarbons such as piperazines; amidines such as guanidine; alkylenoxy polyamines and alicyclic hydrocarbon diamines such as menthane diamine. Preferred polyamines are the alkylene polyamines of 2–10 carbons and piperazine and substituted piperazines.

Primary and secondary aliphatic diamines, triamines, tetramines, pentamines and hexamines are desirable amine reactants. Suitable alkylene polyamines which may be employed are: ethylene diamine, 1,2-diamino propane, 1,3-diamino propane, butylene diamine, diethylene triamine, dipropylene triamine, triethylene tetramine, tetraethylene pentamine, pentamethylene diamine, 1,6-hexamethylene diamine, 3,3′-imino bis propylamine, 3-methylamino propylamine, 3-isopropylamino propylamine, 3,3′-methylimino bis propylamine.

Water-soluble alkylolamines which can be employed include N-aminoethyl ethanolamine and glycol amines having two or more amino groups and at least two replaceable amino hydrogens. Those alkylolamines having 2–10 carbons are most desirable and include N-aminoethyl ethanolamine [N-(2-hydroxy-propyl) ethylene diamine] and ethylene bis-oxypropyl amine, for example.

Equally applicable in the practice of the invention are the alkyl or aryl-substituted derivatives of the above whether said substitution takes place on the carbon or nitrogen atoms. Thus the polyamino compound must have at least two primary, two secondary or one primary and one secondary amino group within its molecule which two amino functions must be separated by at least one carbon atom. In any suitable polyamine at least two amino nitrogens must have one or more available hydrogen atoms. Generally, but not specifically related to the compositions set forth above, are many other polyamino compounds, all of which produce prepolymers when reacted with high-oxirane fatty materials described herein. These polyamino compounds include saturated cyclic polyamines such as piperazine, substituted piperazines such as N-aminoethyl piperazine, and diamino menthane.

Benzenoid amines which can be reacted with the fatty epoxide to form prepolymers having excellent properties include ortho-, meta- and paraphenylene diamine, orthotolidine and other nuclear-substituted aryl amines. The guanidines and substituted guanidines having the required number of available amino hydrogens may also serve as the polyamine component in the reaction. Diphenyl guanidine is an example of a satisfactory substituted guanidine while phenyl biguanide and ortho tolyl biguanide are representative of compositions containing two guanidine radicals.

In the case of the foregoing polyamines, the polyamine is soluble in the epoxidized ester component of the reaction and suitable contact between reactants is assured.

Curing of the epoxy ester or prepolymer after deposition of these materials on the fibrous glass may be effected by heat provided an epoxy curing agent is incorporated in the ester or by use of an epoxy curing agent in the form of gas. Boron trifluoride is particularly suitable as a curing agent in the latter case. The examples which follow are set forth to illustrate specific embodiments of the invention and should not be construed as placing any limitation on the scope thereof.

*Example 1*

Epoxidized linseed oil having an oxirane content of 9.1% and iodine value of 4.6 and a Gardner viscosity of T-U is placed in a container in which a roller wick or pad is partially immersed and glass fibers have passed over the wick at high speed. As the fibers are attenuated and wound, the oil forms a thin film on the fibers protecting against abrasion. The coated fibers retain the thin layer of epoxidized oil during weaving and formation of the fibers into fabric. Prior to weaving, the fibers are passed through a chamber containing boron trifluoride gas, the rate of passage through the chamber being sufficient to increase the cohesiveness of the fibers but not sufficient to permit the coating to set up. After weaving the fabric, the sized fabric is sprayed with an additional coating of the same epoxidized oil and the coated fabric is then passed through a chamber containing boron trifluoride gas to cure the epoxide and form a hard, tough layer.

*Example II*

To 100 grams of the epoxidized oil employed in Example I was added 10 grams of citric acid (10 gm. in 100 g. water) as an epoxy curing agent. The oil was mixed with the solution and 4 grams polyvinyl alcohol was added to promote emulsification. The emulsion thus formed was diluted further with water to provide an emulsion containing 1–5% of the epoxidized linseed oil. The glass fibers were coated with this emulsion by spraying. The coated fibers were then woven into fabric form and the fabric was heated to about 200° C. for about five minutes. The fibers were thereby provided with a tough adherent coating.

*Example III*

A mixture of 100 parts of epoxidized linseed oil (oxirane content of 9.0%; iodine value 4.0) and 30 parts tetraethylene pentamine was vigorously agitated and heated to about 80° C. for approximately four hours. The heating time necessary for forming the prepolymer while insuring that complete polymerization did not take place was determined by the solubility of the reaction mixture in a dilute 1% acetic acid solution. A drop of the reaction mixture was removed at intervals and when the drop was soluble in the dilute acetic acid solution the reaction was terminated and the reaction product was cooled. The product was soluble in the dilute aqueous acid and when deposited on a glass surface and heated with removal of water it formed a hard film.

Additional prepolymers prepared in accordance with the method of Example III using various epoxidized glycerides and polyamines were produced as follows. In all cases, 30–40 parts of the polyamine were reached with 100 parts of the oil.

| Epoxidized Oil | Percent Oxirane | Iodine Value | Diamino Compound | Reaction Temperature, ° C. | Time, hours |
|---|---|---|---|---|---|
| Menhaden | 8.2 | 12.1 | piperazine | 87 | 4 |
| Linseed | 9.7 | 2.0 | p-phenylene diamine. | 80 | 5 |
| Soy | 6.4 | 6.2 | menthane diamine. | 95 | 6 |
| Hempseed | 7.8 | 6.0 | sym.-diphenylguanidine. | 75 | 8 |
| Linseed | 9.2 | 3.2 | thiourea | 85 | 5 |
| Do | 9.2 | 3.2 | phenyl biguanide | 85 | 5 |
| Do | 9.2 | 3.2 | N-aminoethanolamine. | 80 | 6 |
| Do | 9.2 | 3.2 | ortho tolidine | 90 | 4 |

The prepolymers described in the examples above vary a great deal in color, viscosity, etc., depending upon the reactants and the severity of reaction conditions. As a general rule the color of the prepolymer darkens with increase in oxirane value of the oxirane reactant. For example, prepolymers from a given diamino compound and epoxidized soybean oil are usually much lighter in color than those obtained from epoxidized marine oils. The same applies to the softness of the final resin.

It is thus apparent that the present invention provides many advantages over conventional glass fiber treatments. It is not necessary to burn off the size or lubricant, and this is a distinct advantage inasmuch as burning causes a loss of up to 50% of fiber strength. The polymerized epoxide forms an ideal base for further finishing in a laminate. The epoxide is compatible with other resins such as epoxy resins prepared from epichlorohydrin and bis-phenols as well as polyesters and polyamides. Also, the curing agent can be applied during various stages of processing. Because of the low viscosity and polar characteristics of the fatty epoxide and the prepolymer, considerable versatility in operations is realized.

Obviously, many modifications and variations of the invention as hereinbefore set forth may be made without departing from the spirit and scope thereof and, therefore, only such limitations should be imposed as are indicated in the appended claims.

We claim:

1. An article of manufacture comprising glass fibers and a thin continuous film on said fibers, said film consisting of an epoxy compound selected from the group consisting of epoxidized triglycerides having an oxirane oxygen content above about 8.5%, and prepolymers of said epoxidized triglycerides and polyamines having at least 2 nitrogen atoms and at least one carbon atom between nitrogens, said prepolymer being prepared by heating and reacting said epoxidized triglycerides with said polyamines until an aliquot portion of the reaction product is soluble in a 1% aqeous acetic acid solution.

2. The coated glass fibers of claim 1 wherein the film is cured to form a flexible solvent and heat resistant coating.

3. An article of manufacture comprising glass fibers and a thin continuous film on said fibers, said film consisting of an epoxy compound selected from the group consisting of an epoxidized vegetable oil having an oxirane oxygen content above about 8.5%, and prepolymers of said epoxidized vegetable oil and a polyamine selected from the group consisting of lower alkylene polyamines, arylamines and alicyclic diamines, said prepolymer being prepared by heating and reacting said epoxidized vegetable oil with said polyamine until an aliquot portion of the reaction product is soluble in a 1% aqueous acetic acid solution.

4. An article of manufacture comprising glass fibers and a thin continuous film on said fibers, said film consisting of an epoxy compound selected from the group consisting of oxirane oxygen containing drying oils and oxirane oxygen containing semi-drying oils, the oxirane oxygen content thereof being above about 8.5%, and prepolymers of said oxirane oxygen containing oils with a polyamine selected from the group consisting of aliphatic polyamines of 2–10 carbons, aryl polyamines and alicyclic polyamines, said prepolymer being prepared by heating and reacting said oxirane oxygen containing oils with said polyamine until an aliquot portion of the reaction product is soluble in a 1% aqueous acetic acid solution.

5. An article of manufacture comprising glass fibers and a thin continuous film on said fibers, said film consisting essentially of epoxidized vegetable oil having an oxirane oxygen content of above about 8.5%.

6. An article of manufacture comprising glass fibers and a thin continuous film on said fibers, said film consisting essentially of a water soluble prepolymer of an epoxidized drying oil having an oxirane oxygen content above about 8.5% and tetraethylene pentamine, said prepolymer being prepared by heating and reacting said epoxidized drying oil with said polyamine until an aliquot portion of the reaction product is soluble in a 1% aqueous acetic acid solution.

7. The coated glass fibers of claim 6 wherein the epoxidized drying oil is epoxidized linseed oil.

8. A method of lubricating and coating glass fibers with a polymer comprising applying to said fibers a thin layer, said layer consisting of an epoxy compound selected from the group consisting of epoxidized triglycerides having an oxirane oxygen content above about 8.5%, and prepolymers of said epoxidized triglycerides and polyamines, said prepolymers being prepared by heating and reacting said epoxidized triglycerides with said polyamine until an aliquot portion of the reaction product is soluble in a 1% aqueous acetic acid solution, and distributing said layer over the surface of said fibers to form a continuous film.

9. A method for lubricating glass fibers which comprises applying to the surface of said fibers a coating, said coating consisting essentially of a water solution of a prepolymer, said prepolymer being prepared by heating and reacting an epoxidized vegetable oil having an oxirane oxygen content above about 8.5% and a polyamine until an aliquot portion of the reaction product is soluble in a 1% aqueous acetic acid solution, removing the water from the surface of said fibers and curing said coating by exposing said coating to boron trifluoride gas.

10. An article of manufacture comprising glass fibers and a thin continuous film on said fibers, said film consisting of an epoxy compound selected from the group consisting of epoxidized triglycerides having an oxirane oxygen content above about 8.5%, and prepolymers of said epoxidized triglycerides, said prepolymers of said epoxidized triglycerides being selected from the group consisting of polyethers, polyesters and polyamines, said prepolymers being soluble in a 1% aqueous acetic acid solution.

11. A method for lubricating glass fibers which comprises applying to the surface of said fibers a thin layer, said thin layer consisting of an epoxy compound selected from the group consisting of epoxidized vegetable oils having an oxirane oxygen content above about 8.5%, and prepolymers of said epoxidized vegetable oils and polyamines, said prepolymers being soluble in a 1% aqueous acetic acid solution, along with a strong Lewis acid catalyst in an amount sufficient to increase the cohesiveness of the fibers but not sufficient to permit the layer to set up, and curing said layer by exposing said layer to boron trifluoride gas.

12. A method for lubricating glass fibers which comprises applying to the surface of said fibers a coating, said coating consisting essentially of an aqueous solution of a water-soluble linear polyester prepolymer, said prepolymer consisting essentially of the reaction product of a polybasic acid and epoxidized vegetable oil having an oxirane oxygen content above about 8.5%, said prepolymer being soluble in a 1% aqueous acetic acid solution, removing the water from the surface of said fibers and curing said coating to form a hard, tough, protective layer on said fibers.

References Cited in the file of this patent

UNITED STATES PATENTS

| | | |
|---|---|---|
| 2,386,250 | McNalley et al. | Oct. 9, 1945 |
| 2,647,851 | Schwartz | Aug. 4, 1953 |
| 2,682,514 | Newey | June 29, 1954 |
| 2,694,655 | Pullman et al. | Nov. 16, 1954 |
| 2,732,367 | Shokal | Jan. 24, 1956 |
| 2,794,754 | Schroeder | June 4, 1957 |
| 2,847,395 | Wear | Aug. 12, 1958 |
| 2,872,427 | Schroeder | Feb. 3, 1959 |
| 2,872,428 | Schroeder | Feb. 3, 1959 |
| 2,886,472 | Condo et al. | May 29, 1959 |
| 2,890,228 | Foster | June 9, 1959 |
| 2,900,364 | Wasserman | Aug. 18, 1959 |
| 2,903,381 | Schroeder | Sept. 8, 1959 |
| 2,915,484 | Kohler et al. | Dec. 1, 1959 |
| 2,931,739 | Marzocchi et al. | Apr. 5, 1960 |
| 2,939,761 | Stein | June 7, 1960 |
| 2,958,114 | Marzocchi et al. | Nov. 1, 1960 |
| 2,982,682 | Matlin et al. | May 2, 1961 |
| 2,993,920 | Budde et al. | July 25, 1961 |

FOREIGN PATENTS

| | | |
|---|---|---|
| 561,139 | Canada | July 29, 1958 |

OTHER REFERENCES

Brenner et al.: "Why Specify Prepregs," Materials and Methods, vol. 45, No. 3, March 1957, pp. 120–123.

Duffin: Laminated Plastics, Reinhold Publishing Corp., N.Y., 1958, pp. 26–27.